United States Patent [19]

Sarkissian

[11] 4,262,724
[45] Apr. 21, 1981

[54] LOW PRESSURE AND RUN-FLAT WARNING SYSTEM FOR A PNEUMATIC TIRE

[75] Inventor: Berge Sarkissian, Southington, Conn.

[73] Assignee: Uniroyal, Inc., New York, N.Y.

[21] Appl. No.: 36,611

[22] Filed: May 3, 1979

[51] Int. Cl.³ .............................................. B60C 17/00
[52] U.S. Cl. ........................ 152/330 RF; 116/34 B; 152/330 L; 152/340; 152/347; 152/361 R; 428/58; 428/109; 428/112
[58] Field of Search ........ 152/330 R, 330 RF, 330 L, 152/311, 312, 158, 152, 161, 340, 346, 347, 354 R, 358, 354 RB; 428/57, 58, 61, 107, 112, 109, 110, 114; 116/34 B

[56] References Cited

U.S. PATENT DOCUMENTS

| | | | |
|---|---|---|---|
| 1,144,239 | 6/1915 | Poole | 152/346 |
| 2,713,372 | 7/1955 | Darrow | 152/342 |
| 2,754,876 | 7/1956 | King | 152/341 |
| 2,884,983 | 5/1959 | Cuesta | 152/346 X |
| 3,085,615 | 4/1963 | Sanderson | 152/340 |
| 3,254,692 | 6/1966 | Travers | 152/330 RF |

Primary Examiner—John T. Goolkasian
Assistant Examiner—Thomas Bokan
Attorney, Agent, or Firm—Philip Rodman

[57] ABSTRACT

A pneumatic run-flat insert for a pneumatic tire is provided with circumferential sections having different radii. During vehicle operation in a run-flat condition the different insert radii cause a vibratory disturbance at a wheel axle that alerts the driver of the existence of a run-flat condition or an abnormally low-pressure condition in the tire. During normal driving conditions there is clearance between the insert and the tire liner and no warning vibrations will occur in the wheel axle.

In various embodiments of the invention the different insert radii correspond to two or more ply sections in an insert ply having different cord angles. A relatively high cord angle ply section will furnish a relatively larger radius than the ply section with a relatively low cord angle.

In further embodiments of the invention a pneumatic or non-pneumatic run-flat insert includes one or more bumps on the insert crown formed of rubber strips for example that furnish the insert with an out-of-round condition that causes a similar vibrating disturbance to warn the driver of a low-tire pressure or run-flat condition.

27 Claims, 25 Drawing Figures

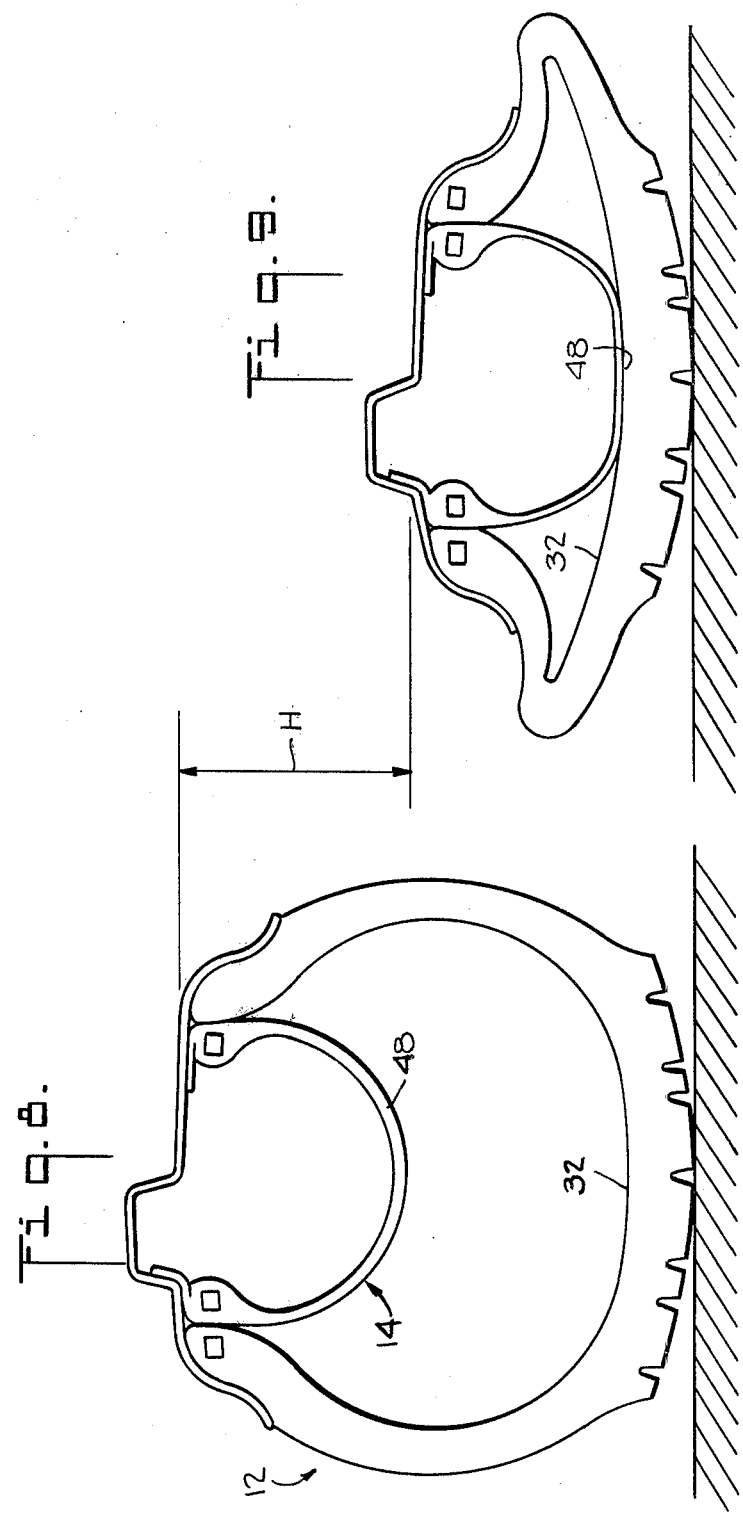

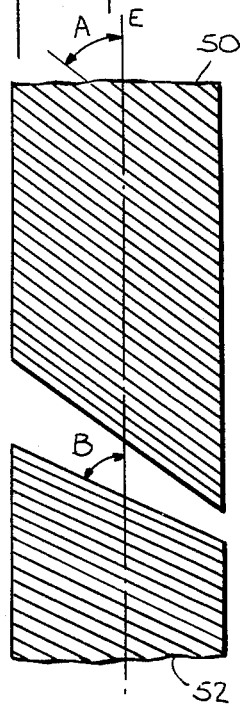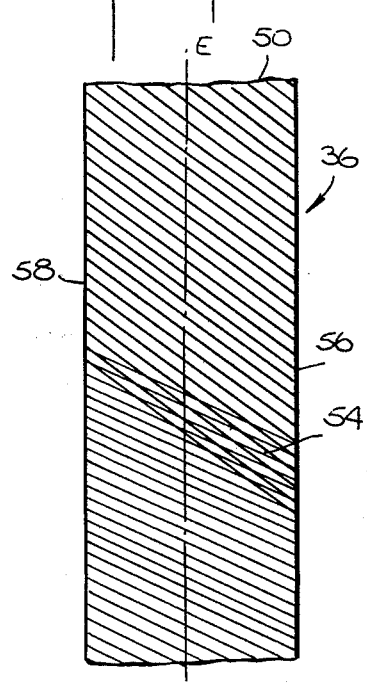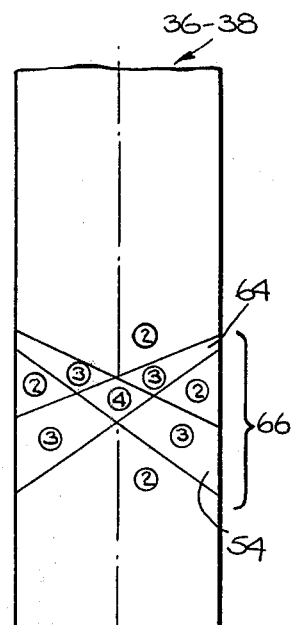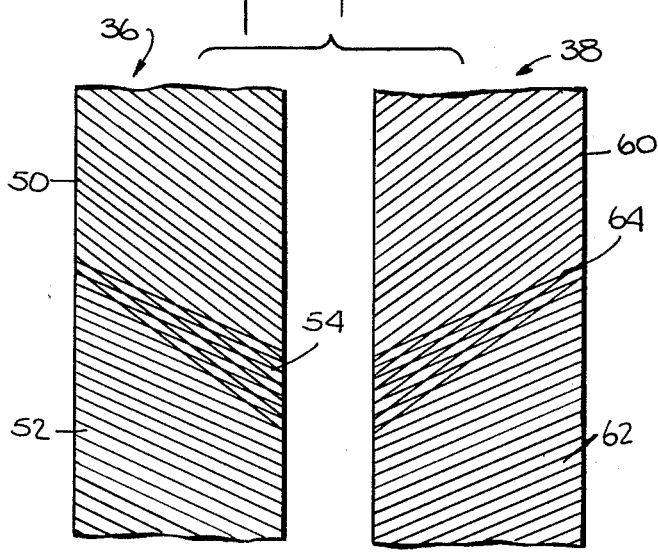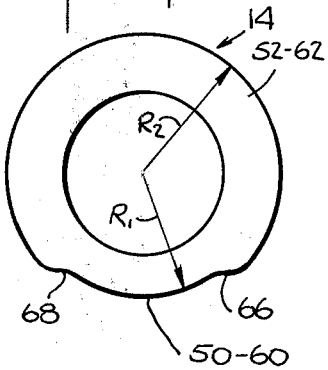

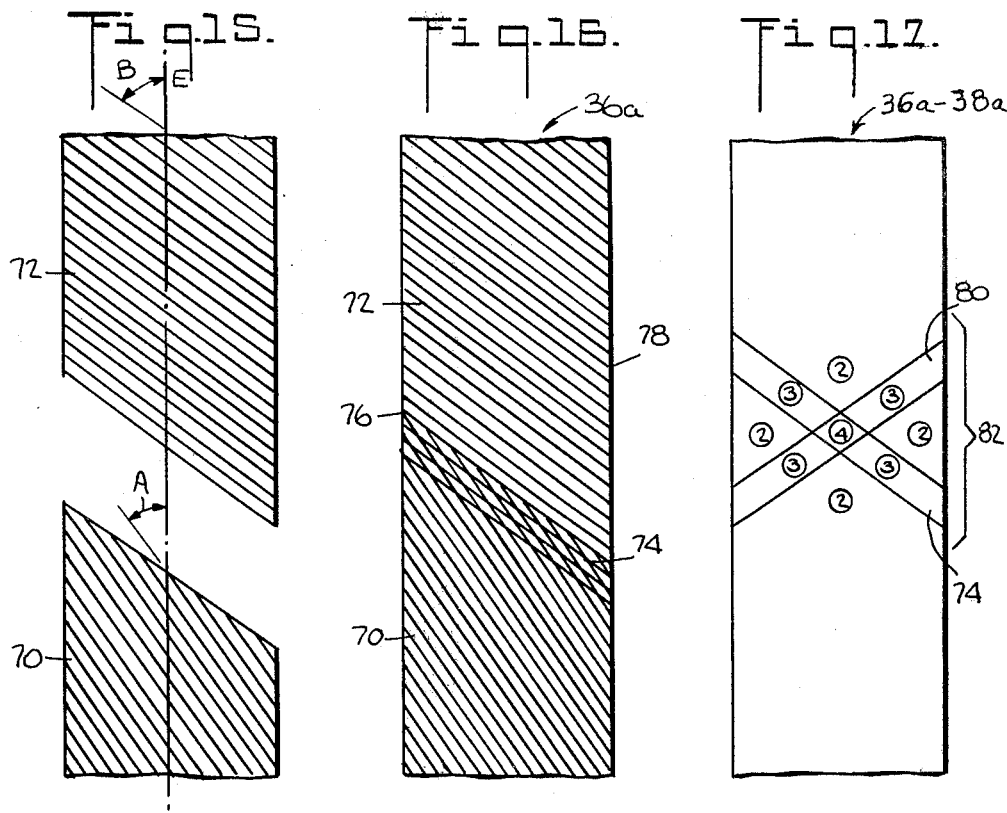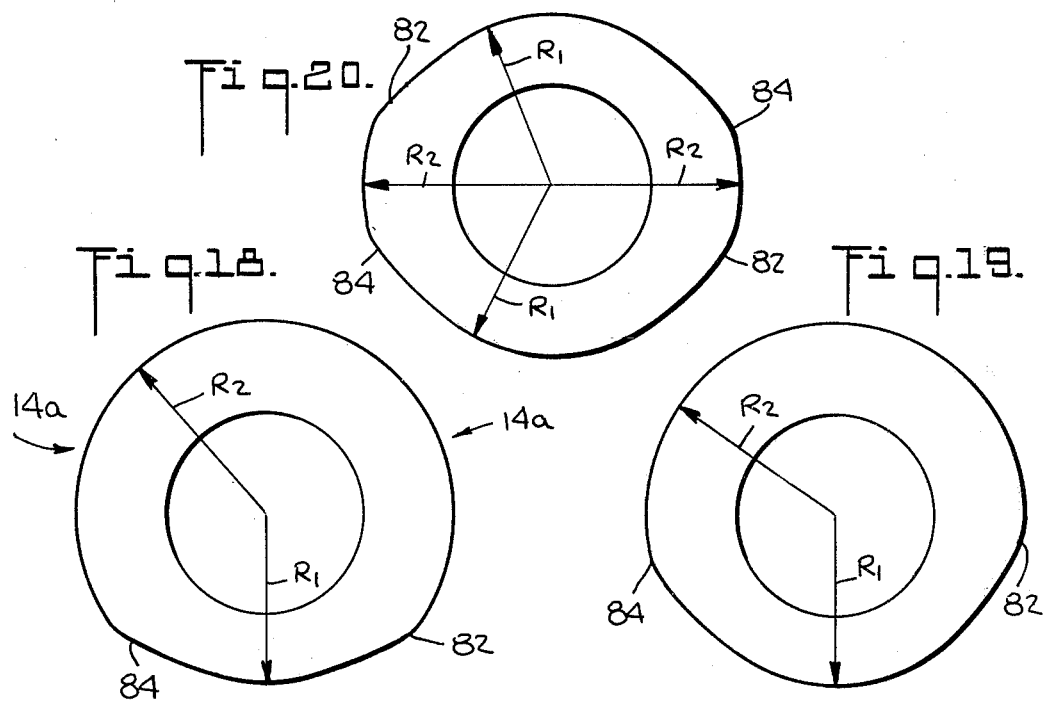

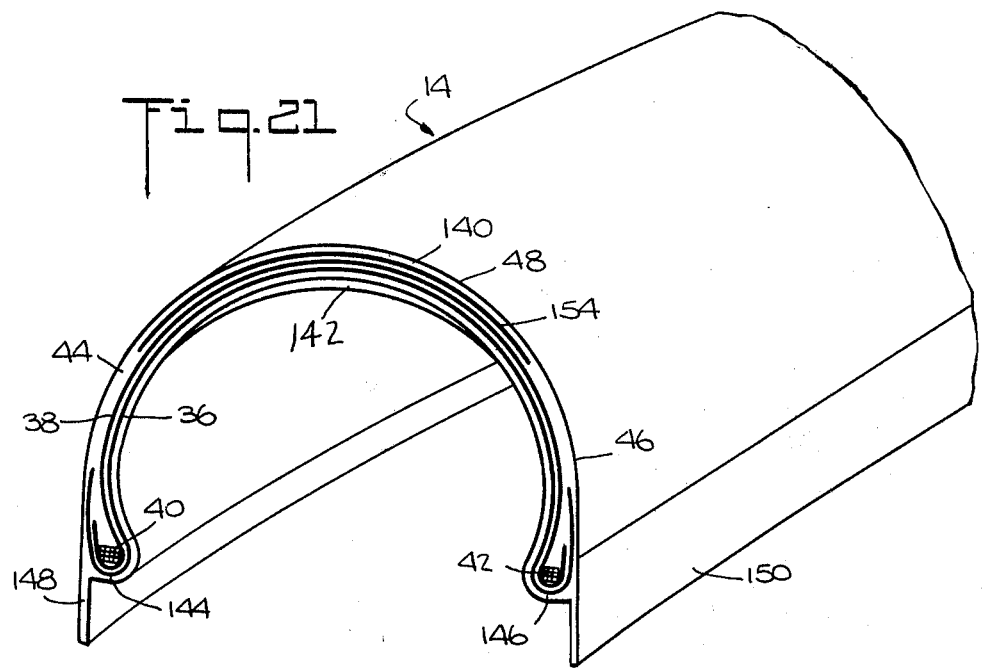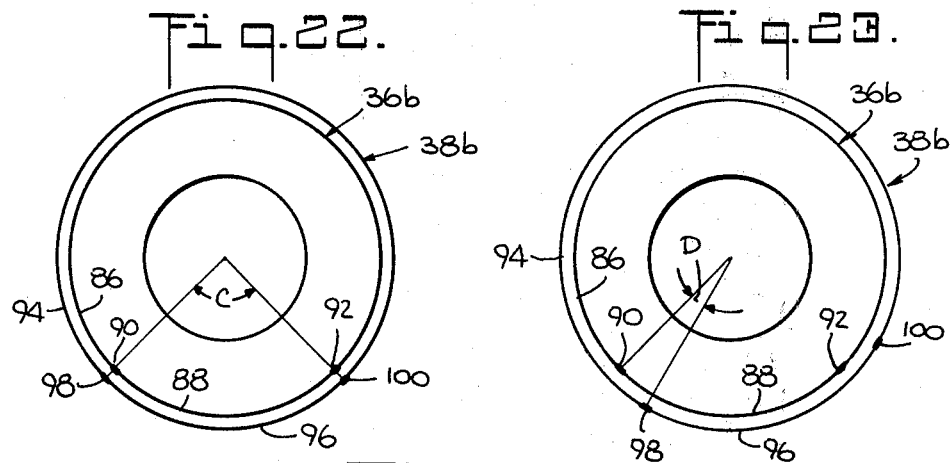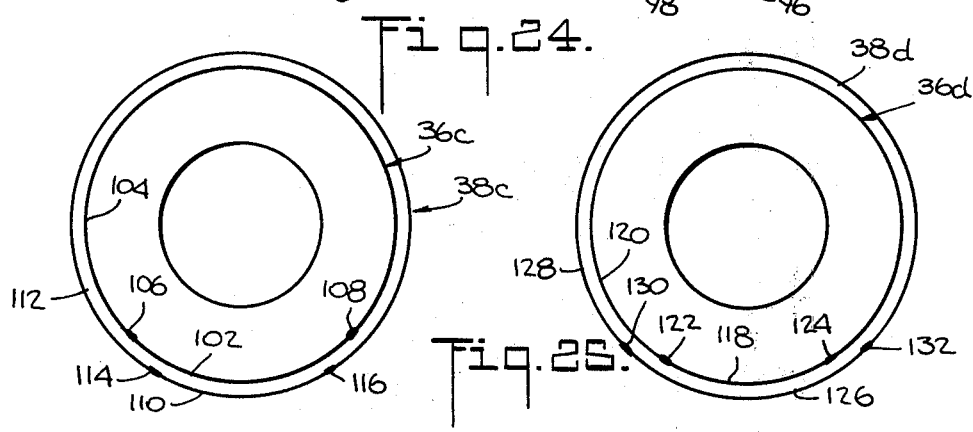

LOW PRESSURE AND RUN-FLAT WARNING SYSTEM FOR A PNEUMATIC TIRE

This invention is directed to pneumatic tires with run-flat capabilities and more particularly to a low pressure warning system as well as a run-flat warning system for a pneumatic tire.

Tire deflations that occur unexpectedly during vehicle use, due to punctures, cuts, etc., are potentially hazardous and nearly always inconvenience the user. Known attempts to deal with these problems have led to the development of tire assemblies that can remain in useful operation during and after a substantial loss of air from the tire inflation chamber.

Examples of such tire assemblies are shown in British Pat. No. 808,481, and in U.S. Pat. Nos. 2,754,876, 3,025,902, 3,085,615, and 3,225,811. These patents disclose a variety of internal pneumatic devices, commonly known as run-flat inserts, for use in combination with a pneumatic tire.

The run-flat insert permits a deflated tire to remain in operation at limited speeds for a limited distance thus avoiding the immediate inconveniences and hazards that are normally associated with abrupt and unexpected tire deflations as well as tire deflations of a less sudden nature.

It has been found that run-flat inserts often operate so smoothly that the driver is unaware of a tire failure that has already occurred. If the driver continues to proceed without knowledge of his run-flat condition it will be only a matter of time before the pneumatic insert fails, resulting in the same inconveniences and hazards that the insert was intended to avoid.

Thus a run-flat system is incomplete without a low pressure warning device to apprise the driver of his run-flat situation. One known approach toward alerting a driver of a run-flat condition is disclosed in U.S. Pat. No. 3,085,615. This patent shows a pneumatic run-flat insert having large radius and small radius sections for causing vibrations in the wheel axle that are transmitted through the steering wheel to warn the driver of a run-flat condition. However, the large radius portion is formed by materials that are relatively more stretchable under pressure than the materials which form the small radius portion. The large radius portion is thus softer under load than the small radius portion and, in a run-flat condition, will compress during contact with the tire liner. Consequently the total tire deflection or axle height will remain substantially the same in each revolution of the affected tire resulting in minimal vibrations, if any, that are discernible by the driver. Furthermore the differences in surface contour of the insert are more apparent when a low pressure condition exists externally of the insert and while the insert is under relatively high pressure.

It is thus desirable to provide a safety tire with run-flat capacity having a warning system that causes discernible vibrations in a wheel axle to alert a driver of a run-flat situation.

Among the several objects of the present invention may be noted the provision of a novel warning system for alerting a driver of a deflated pneumatic tire, a novel run-flat insert having differences in surface contour that exist whether the tire is pressurized or not, a novel run-flat insert formed with one or more plies having more than one section with different cord angles, and a novel run-flat insert having lobes or protuberances on the insert crown.

Other objects and features will be in part apparent and in part pointed out hereinafter.

The present invention relates to a novel safety tire incorporating a pneumatic run-flat insert structured to warn a driver of a deflated or low pressure condition in his tires while the vehicle is in operation.

The pneumatic insert according to one embodiment of the present invention is mounted on a standard rim for positioning within a tire cavity. The insert can be formed as a generally toroidal-shaped hollow member having a pair of axially spaced apart insert beads arranged to bear against the tire beads and the rim as disclosed in my copending application Ser. No. 833,109 now U.S. Pat. No. 4,153,095.

Preferably the inner surface of the pneumatic insert includes puncture sealant material with the body being formed of tear resistant fabric. If desired suitable lubricants are provided between the insert and the tire.

The insert is of bias ply construction and includes at least one ply section having a relatively high cord angle and at least another ply section having a relatively low cord angle. Both insert ply sections are joined together to form a single ply that is wrapped around a building drum. After the insert has been cured the insert portion formed with the high cord angle ply section will acquire a larger radius than the insert portion formed with the smaller cord angle ply section. The contour of the insert is thus provided with two distinct radii corresponding to the relatively high cord angle ply section and the relatively low cord angle ply section. By varying the angular difference between the respective ply sections one can control the difference in radii of the insert. Moreover by using more than two alternate cord angle ply sections in the same insert ply one can generate a corresponding number of alternating radii or lobes. The differences in contour of the insert exist whether the tire cavity is pressurized or not.

In another embodiment of the invention a pneumatic insert of the type disclosed in my co-pending application previously referred to, is provided with one or more bumps or protrusions on the insert crown portion. The circumferential extent of the bump or protrusion is substantially equivalent to the size of the contact patch of the pneumatic insert. The bumps can be formed during manufacture of the insert or are adhered to the cured insert in a manner similar to a cold (or hot) recapping process.

When a tire deflation occurs the air escaping from the tire inflation chamber causes the road contacting portion of the tire tread to flatten against the insert crown which provides support for the tread. Air does not simultaneously escape from the insert air chamber because it does not normally communicate with the tire air chamber. The different insert radii attributable to different cord angles of the insert ply or the bumps formed on the insert crown cause the tire axle to deflect in a predetermined manner. The repeated deflections as the tire rotates cause the axle to vibrate, promoting vibrations in the steering wheel and/or the vehicle body. The amplitude and period of the vibrations vary at different speeds. Consequently when the driver is alerted of his run-flat condition he can proceed in a speed range which causes minimal driving discomfort.

The invention accordingly comprises the constructions hereinafter described, the scope of the invention being indicated in the following claims.

In the accompanying drawings in which various possible embodiments of the invention are illustrated.

Figure 1:
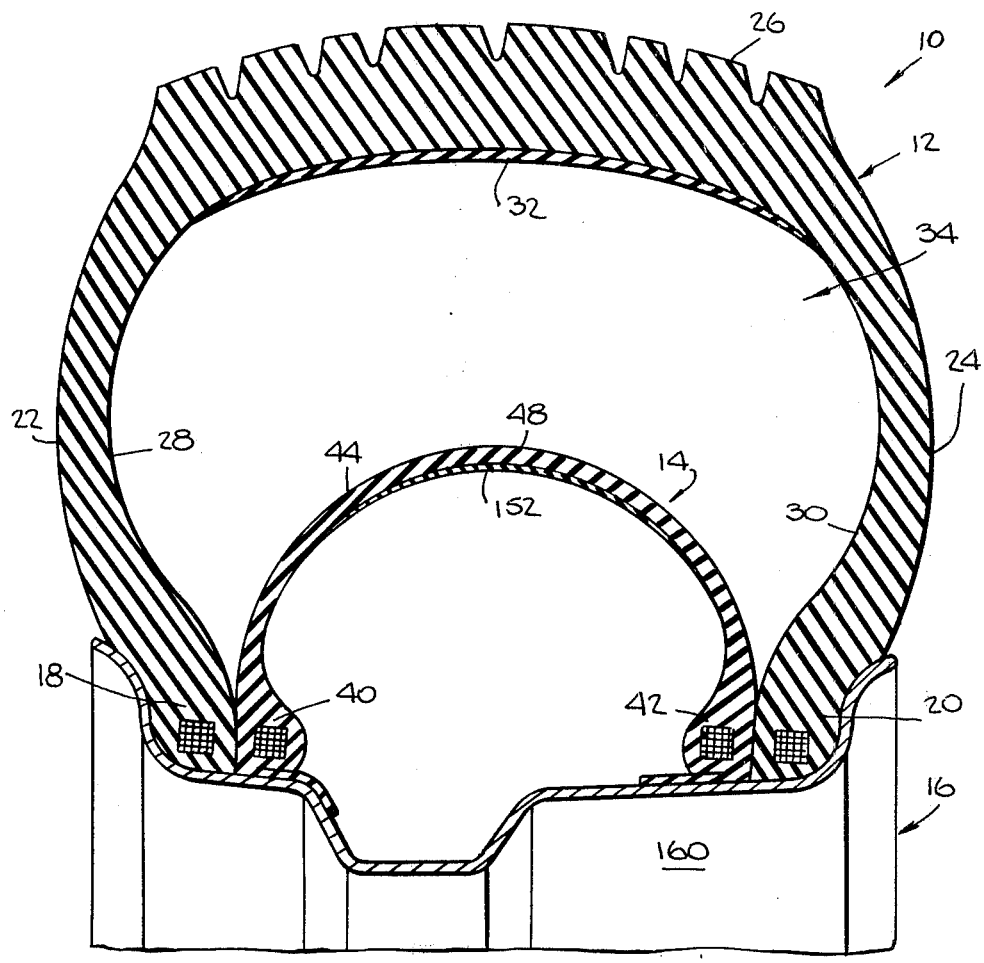
FIG. 1 is a sectional view showing a safety tire and wheel assembly including a run-flat insert incorporating one embodiment of the present invention.

FIGS. 8-9 compare the normal and run-flat positions of the safety tire and wheel assembly of FIG. 1;

FIGS. 10-11 show the ply sections of an insert ply before and after they have been joined together;

FIGS. 12-13 show two insert plies before and after they have been superimposed, with the ply cords not shown in FIG. 13 for purposes of clarity in illustrating a transition region;

FIG. 14 is a simplified view of a pneumatic insert formed with the FIG. 13 ply arrangement;

FIGS. 15-17 show other ply arrangements for another embodiment of the present invention;

FIGS. 18-20 are simplified views of further embodiments of the present invention;

FIG. 21 shows the penumatic insert of FIG. 1 in greater detail; and

FIGS. 22-25 are simplified views of other insert ply arrangements incorporating further embodiments of the present invention.

Referring to the drawings a safety tire and rim assembly is generally indicated by the reference number 10 in FIG. 1. The assembly 10 comprises a standard tubeless pneumatic tire 12, with a pneumatic insert member 14 both mounted on standard one-piece drop center rim 16.

The pneumatic tire 12 includes spaced annular bead portions 18 and 20 with sidewalls 22 and 24 extending therefrom and a tread portion 26 bridging the tire sidewalls. Inner surfaces 28, 30, and 32 of the tire sidewalls and tire tread define a tire cavity 34.

Referring to FIGS. 1 and 21 the pneumatic insert member 14 is of generally toroidal shape and comprises two fabric reinforced rubber plies 36 and 38 wrapped around annular beads 40 and 42 that are of smaller cross section than the tire beads 18 and 20. The insert 14 also comprises sidewalls 44 and 46, and a crown portion 48.

The insert plies 36 and 38 are laminated orthotropic structures such as rubber impregnated matrices of cord. The cords are formed of any suitable material such as rayon with a minimum tensile strength of 46 pounds and 20 to 24 ends per inch, which provides a breaking strength of approximately 920 to 1104 pounds per inch. Polyester with a tensile strength of from 47 to 50 pounds and approximately 22 ends per inch can also be used, and provides a breaking strength of approximately 1034 to 1100 pounds per inch. Other types of fabric such as monofil nylon cords of 2300 denier or a high tensile strength polyamide sold under the designation Kevlar can be used as well. The use of steel cords is also feasible.

The ply 36 comprises at least one ply section 50 (FIG. 10) having a relatively low cord angle A with respect to an equatorial plane E of the insert 14 and another ply section 52 having a relatively high cord angle B with respect to the equatorial plane E. Preferably the ply sections 50 and 52 are formed of the same material differing only in the respective cord angles. The ply sections 50 and 52 are cut along their respective cords as shown in FIG. 10 and joined together in an overlap splice 54 (FIG. 11). As seen in FIG. 11 the splice 54 is longer at an edge 56 of the ply 36 than at an edge 58.

The ply 38 (FIG. 12) is equivalent to the ply 36 in a flipped over condition and includes a low cord angle section 60 corresponding to the section 50, a high cord angle section 62 corresponding to the section 52, and an overlap splice 64 corresponding to the overlap splice 54.

The plies 36 and 38 are superimposed with the cords and splice in one layer intersecting the cords and splice of the other layer. Thus the splices 54 and 64 are overlapped in criss-cross fashion as shown in FIG. 13 forming a transition region 66. The transition region 66 is characterized by a number of multiple ply areas consisting of two, three and four overlapping plies as indicated in FIG. 13.

The number of overlap splices in each insert ply corresponds to the number of ply sections that form the insert ply. Thus an insert ply consisting of two ply sections will have two overlap splices. An insert 14 cured in a known manner, and formed of the superimposed plies 36 and 38 is characterized by two transition regions 66 and 68 (FIG. 14) that result from two sets of two overlapping splices such as shown in FIG. 13. The transition regions 66 and 68 also represent the boundaries of the low angle ply sections 50, 60 and the high angle ply sections 52, 62.

Following curing of the insert 14 the low cord angle ply sections 50, 60 have a radius R1 that is smaller than the radius R2 of the high cord angle ply sections 52, 62. Thus the insert 14 is furnished with two distinct radii which, for the purposes of this invention, is a desirable nonuniformity.

In a further embodiment of the invention as shown in FIGS. 15-17 a ply 36a comprises a low angle (A) ply section 70 and a high angle (B) ply section 72 cut at the same angle (B). The ply sections 70 and 72 are joined together in an overlap splice 74 (FIG. 16) that is of equal length along both edges 76 and 78 of the ply 36a. Although not shown in detail in FIG. 17, a ply 38a of this embodiment is equivalent to the ply 36a in a flipped over condition and includes an overlap splice 80 corresponding to the overlap splice 74. The plies 36a and 38a are superimposed with the splices 76 and 80 overlapped in criss-cross fashion forming a transition region 82 consisting of two, three and four overlapping plies as indicated in FIG. 17. The overlap splices 74 and 80 of the transition region 82 are of uniform extent along each edge of the superimposed plies 36a, 38a.

It should be noted that the area of the overlap splices 54 and 64 in FIG. 13 is dependent upon the angles A and B. In general, the overlap splice area increases as the difference between the angles A and B increases. However, the area of the overlap splices 74 and 80 in FIG. 17 does not depend upon the differences between the angles A and B, and the extent of the overlap can be made quite narrow such as for example ½ inch.

An insert 14a, as shown in FIG. 18, cured in a known manner and formed of the superimposed plies 36a and 38a, is characterized by two transition regions 82 and 84 that result from two sets of two overlapping splices such as shown in FIG. 17. The transition regions 82 and 84 represent the boundaries of the low angle ply sections such as 70 and the high angle ply section such as 72.

Following curing of the insert 14a the low cord angle ply sections have a radius R1 that is smaller than the radius R2 of the high cord angle ply sections. The transition regions 82 and 84 are narrower than the transition regions 66 and 68 and therefore take up less circumferential extent than the transition regions 66 and 68, and permit generation of a greater number of $R_1$ and $R_2$ sections than the FIG. 14 embodiment.

By varying the relative lengths of each ply section 70, 72 (FIG. 16) in the ply 36a for example, one can control the peripheral extent of each circumferential portion defined by the radii R1 and R2 in FIGS. 18 and 19. By using more than two ply sections at different angles in each respective insert ply one can generate a corresponding number of alternating radii or lobes as shown in FIG. 20. Furthermore by varying the angular difference between ply sections of a single insert ply one can control the difference in radii of the high and low angle sections. Thus for an insert with a given bead diameter one can provide circumferential sections having different radii, the magnitudes of which are directly related to the respective selected cord angles for each ply section that comprise the insert ply or plies being used.

Various possible superimposed insert ply arrangements such as shown prior to expansion and curing in FIGS. 22-25 are incorporated in further embodiments of the invention. For example FIG. 22 shows an insert ply 36b formed of ply sections 86 and 88 of different cord angles separated by transition zones 90 and 92. A ply 38b superimposed on the ply 36b in a manner similar to that previously described is formed of ply sections 94 and 96 of corresponding different cord angles separated by transition zones 98 and 100. The ply sections 88 and 96 are of substantially equal circumferential extent as indicated by the angle C, and the transition zones 90, 98 and 92, 100 are in substantial registration. It is not necessary that the overlapping ply sections be of the same cord angle as long as the selected cord angles furnish, a radius in the circumferential region defined by the angle C that is distinctly different from the radius defined in the circumferential section beyond the angle C.

FIG. 23 differs from FIG. 22 by a predetermined offset D between the transition zones 90, 98 and 92, 100. The offset D can exceed the angular relationships depicted in FIG. 23 and it will be appreciated that such relationships as illustrated are not intended to limit the scope of the invention. The FIG. 23 embodiment will have three distinct radial dimensions and four distinctive circumferential sections. A first radial dimension is attributable to overlapping ply sections having the same cord angle such as B—B, which lie on the major circumferential sections defined between the transition zones 90 and 100. A second radial dimension is attributable to overlapping ply sections having different cord angles such as A-B or B-A, which lie between the transition zones 92-100 and, 90-98 respectively. A third radial dimension is attributable to overlapping ply sections having the same cord angles such as A—A which lie on the minor circumferential sections defined between the transition zones 98 and 92. Thus, depending upon the number of overlapping ply sections and the offset between the transition regions of such overlapping ply sections one can construct an insert having a plurality of different radii.

FIG. 24 shows an insert ply 36c formed of ply sections 102 and 104 of different cord angles separated by transition zones 106 and 108, whereas an insert ply 38c is formed of ply sections 110 and 112 of corresponding different cord angles separated by transition zones 114 and 116. However the inner ply section 102 is of greater circumferential extent than the corresponding ply section 110.

FIG. 25 shows an insert ply 36d formed of ply sections 118 and 120 of different cord angles separated by transition zones 122 and 124, whereas an insert ply 38d is formed of ply sections 126 and 128 of corresponding different cord angles separated by transition zones 130 and 132. The inner ply section 118 is of smaller circumferential extent than the corresponding ply section 126.

The FIG. 24 and FIG. 25 embodiments also furnish an insert having three distinct radial dimensions and four distinctive circumferential sections because of overlapping ply sections with A—A cord angles, A-B cord angles, B-A cord angles and B—B cord angles.

Referring to FIG. 21 the insert member 14 further includes an outside cover 140 preferably formed of rubber that is less than 0.05 inches thick, an inner diffusion resistant liner 142 preferably formed of chlorobutyl that is less than 0.1 inches thick, and toe strips 144 and 146 around the insert beads 40 and 42. A pair of annular rings 148 and 150 henceforth called flaps are respectively joined to the outside surfaces of the insert sidewalls 44 and 46.

The flaps 148 and 150 are preferably formed of rubber reinforced fabric ranging in thickness from approximately 0.05 inches to 0.1 inches.

The inner diameter of the flaps 148 and 150 are preferably from 2 to 3 inches smaller than the diameter of the insert beads 40 and 42. The flaps 148 and 150 also preferably extend approximately 1.5 to 2 inches below the toe strips 144 and 146 (FIG. 14) and need not extend identical amounts. A layer of puncture sealant material 152 (FIG. 1) such as disclosed in U.S. Pat. No. 3,981,342 coats the inside surface of the insert member 14.

A warning system incorporating a pneumatic insert having different radii is of limited value unless the insert is protected against puncture. When an object such as a nail is picked up by a tire a leak will develop that eventually causes the tire to collapse against the insert. The nail may come in contact with the insert and cause an insert failure. The insert pressure is then liberated into the tire which reinflates momentarily. Thus, an insert which also loses its air pressure will allow a driver to drive his vehicle until all the insert air pressure is lost. The driver is then forced to stop without warning facing whatever inconveniences and hazards that accompany such a stop.

In response to this problem the present insert also includes a tear-resistant reinforcement 154 (FIG. 21) provided at the insert crown portion 48 extending into the insert sidewalls 44 and 46 above or between the insert plies 36 and 38. The reinforcement 154 can comprise a fabric or wire belt, a high modulus rubber strip or any suitable known specially woven tear-resistant fabric such as triaxially woven fabric or chafer fabric. The strength of the tear-resistant material can be measured by penetrating the material with a 0.16 inch diameter nail for example, and pulling the nail and material in opposite directions parallel to the plane of the material. The tearing force required to pull the nail a distance of 0.5 inches is measured, since this size hole would deflate an insert member 14 even with puncture sealant. An adequate level of protection is obtained by material requiring a tearing force in excess of 60 lbs.

The tear resistant reinforcement 154 in the crown region and the layer of puncture sealant 152 on the inner liner of the insert 14 help the insert to remain in operation even when contacted by objects which lead to a tire failure, as disclosed in detail in my previously referred to patent application. Thus the integrity of the warning system is assured.

Valve means and other associated structure for inflating the tire 12 and the insert 14, although not shown are also disclosed in detail in my U.S. Pat. No. 4,153,095. The mounting and inflation procedures for the tire 12 and the insert 14 are likewise disclosed in detail in said patent application.

When a run-flat condition occurs such as shown in FIG. 9, the inner surface 32 of the tire tread deflects against the insert crown 48 causing the rim 16 to displace an amount represented by the dimension H with respect to the normal running condition as shown in FIG. 8. However because the run-flat ride quality with the tire and wheel assembly 10 is so smooth that a driver may not recognize that a flat has occurred or is occurring, the displacement H by itself is not sufficient to apprise the driver of his troublesome situation.

The irregularities or non-uniformities in the contour of the insert 14 such as shown in FIGS. 6–7 and 18–20 are intended to introduce a vibrating condition in the wheel axle when a run-flat condition has occurred. The vibrations, which are transmitted to the steering wheel or the vehicle body are intended to be atypical of those usually encountered under normal driving conditions and their atypical quality will alert the driver, while the vehicle is still operable, that one of the tires must be repaired.

Figures 6, 7:
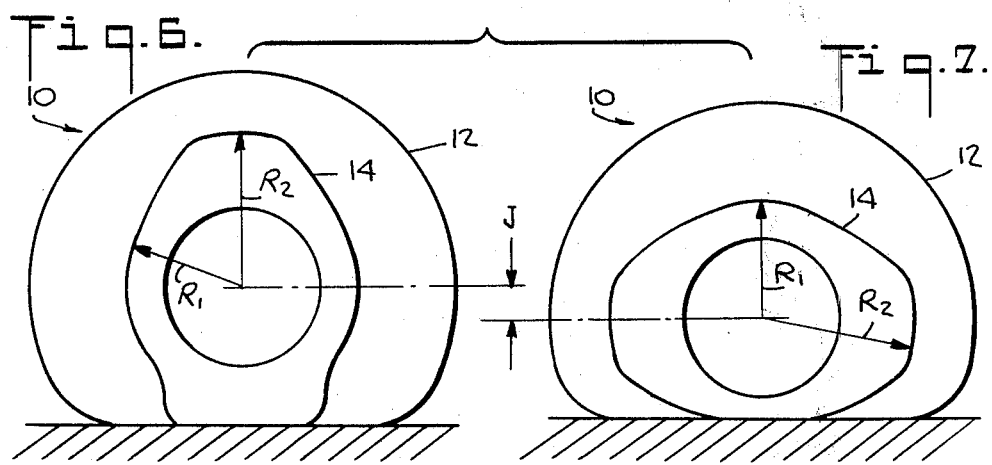
FIGS. 6-7 are simplified views of two different operating positions of a further embodiment of the present invention.

For example a safety tire and wheel assembly 10 in a run-flat condition as shown in FIGS. 6 and 7 has an axial deflection J as the tire moves from the position of FIG. 6 to the position of FIG. 7. The axial deflection J can be compared to the amplitude of vibrations that occur in the run-flat condition. The frequency of such vibrations is related to the number of sections of the insert 14 having different radii and the vehicle speed.

It should be noted that axial deflection J relates not only to the differences between R1 and R2 of the insert 14 but also to the ability of insert 14 to resist deflecting a disproportionate amount under load relative to the R1 and R2 dimensions.

A pneumatic insert 160 (FIGS. 4 and 5), which is representative of the prior art, also includes two sections of R1 magnitude and two sections of R2 magnitude. However the R1 and R2 magnitudes are not attributable to ply sections having different cord angles but to materials having different stretch characteristics under pressure such as disclosed in U.S. Pat. No. 3,085,615. Thus the R2 section is formed of material which is more stretchable under pressure than the R1 section.

Accordingly the R2 section increases in size as the tire pressure drops below that of the insert. However because the R2 section of the insert 160 is more stretchable than the R1 section it is softer under load and will deflect a disproportionately greater amount than the R1 section. Therefore the net deflection K is of lesser magnitude than the deflection J (FIGS. 6 and 7) furnished by the present invention. Consequently any run-flat vibrations attributable to the deflection K may not be recognized by a driver as being atypical of those usually encountered under normal driving conditions.

Moreover it is my experience that any minimal vibrations felt at low speeds, such as those up to 45 miles per hour, often vanish at high speeds such as 55 and 65 mph.

Furthermore as heat builds up soon after a run-flat condition has occurred the stretchable portion of the insert will tend to grow with a resulting increase in softness because its modulus of elasticity decreases with an increase in temperature.

In contrast, the magnitude of the R1 and R2 sections of the insert 14 in FIGS. 6 and 7 does not depend on a reduction in tire pressure below that of the insert. The R1 and R2 dimensions of my insert are substantially constant whether the tire cavity is inflated or not. For example when the insert 14 is inflated to 50 psi, which is approximately twice the inflation pressure of passenger tires, and the tire is deflated, the change in insert dimensions is less than 0.5% and the drop in insert inflation pressure is less than 1 psi.

An insert made according to the present invention included two insert plies, each having two ply sections of different cord angles having a 10 degree angular difference and arranged at a 75% high angle—25% low angle circumferential relationship as shown in FIG. 18. The insert, when inflated to 50 psi, included a minimum radius of 9.95 inches and a maximum radius of 10.40 inches. A P205/70 R 14 tire containing the insert was deflected and subjected to normal load conditions (Tire and Rim Association's load rating of 1180 lbs at 26 psi). The R1 section deflected 2.68 inches under load and the R2 section deflected 2.34 inches under load resulting in a J value of 0.34 inches. Thus 0.34/(10.4-9.95) or 75% of the difference in radii is translated into axial displacement J.

The following table summarizes the vibration qualities of several insert constructions incorporating the present invention and operating in a run-flat condition. Tire deflation was achieved after an initial warmup by removing the valve core used for inflating the tire cavity 34.

The less clearance that exists between the insert and the tire liner under normal driving conditions, the sooner the driver will become aware of a loss of inflation pressure. During normal running conditions a minimum clearance of 0.1 inches between the inner tread surface 32 and the highest point on the insert crown was found satisfactory. Vibrations become discernible when the tire inflation pressure fell to 10 to 15 psi. Thus the insert becomes effective as a warning system even before complete deflation occurs.

| Insert Construction | 0–25 | 25–35 | Miles per Hour 35–45 | 45–55 | 55–60 | 60–65 |
|---|---|---|---|---|---|---|
| (a) 65°/60° (b) 75%/25% (c) 0.14 | 0 | 1 | 0 | 1–2 | 1 | 0 |
| (a) 65°/60° (b) 50%/50% (c) 0.25 | 0 | 0 | 1 | 2 | 2 | 1 |
| (a) 65°/58° (b) 75%/25% (c) 0.28 | 1 | 2 | 1 | 2 | 1 | 0 |
| (a) 65°/58° (b) 50%/50% (c) 0.37 | 1 | 0 | 1 | 2–3 | 2 | 2 |
| (a) 65°/55° (b) 75%/25% (c) 0.52 | 3 | 1 | 2–3 | 3–4 | 2 | 1 |
| (a) 65°/55° (b) 50%/50% | 1 | 1 | 2 | 3–4 | 3 | 3 |

| Insert Construction | Miles per Hour | | | | | |
|---|---|---|---|---|---|---|
| | 0–25 | 25–35 | 35–45 | 45–55 | 55–60 | 60–65 |
| (c) 0.50 | | | | | | |

0 = no noticeable vibrations
1 = not noticeable but mild vibrations
2 = moderate vibrations and shakes
3 = harsh uncomfortable ride
4 = extremely harsh severe shakes
(a) refers to the cord angle of one insert ply section with respect the cord angle of another insert ply section on the building drum.
(b) is the corresponding circumferential proportion of each ply section.
(c) is the radial runout, that is R2-R1.

The above table shows that the run-flat warning vibrations become harsher as the radial runout (R2-R1 increases). The deflection of a run-flat insert at high speed is more apparent if the two insert ply sections of each of the two insert plies are of approximate equal circumferential extent. Thus a 50% circumferential extent of a ply section having a 65° cord angle and a 50% circumferential extent of the remaining ply section having a 55° cord angle will produce harsh vibrations at 65 mph. However the same 10° angular difference at 75%/25% circumferential extents will produce the same harshness up to approximately 55 mph. At low speeds on the other hand the 75%/25% circumferential extents furnish somewhat more noticeable vibrations than the 50%/50% circumferential extents. In all cases there is always a speed range such as 25–35 mph where one can drive in relative comfort.

In further embodiments of the invention one of the insert ply sections can have a cord angle range of 35° to 90° with the angle difference (B-A) between ply sections of an insert ply ranging from 3° to 20°.

Figure 2:
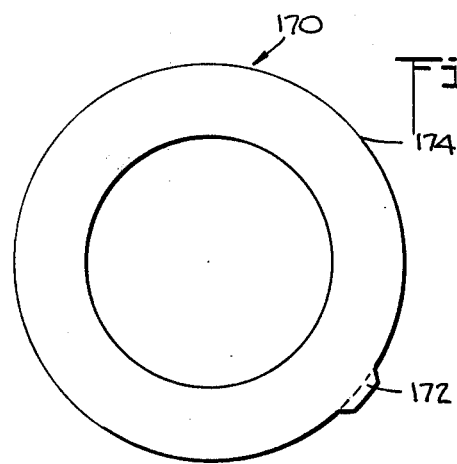
FIGS. 2-3 are simplified views of run-flat inserts incorporating other embodiments of the invention.

Another embodiment of my invention, shown in FIG. 2 comprises a pneumatic insert 170 having an out-of-round condition such as a bump 172 formed at a predetermined location on the insert crown 174.

A pneumatic tire has some enveloping property as it rolls over an object and the greater the enveloping ability of the tire the smoother the resulting ride. Therefore the size of the bump 172 should be comparable to the size of its contact patch between the insert and the tire liner in a run-flat condition. The size of the contact patch of a pneumatic insert of 65° drum angle construction is an ellipse with a major axis of 8 inches and minor axis of 3.75 inches at a rolling radius of 9.3 inches. A bump thickness of about 0.3 inches will cause roughness in ride which is predominant at low speeds (0–30 mph) but fades generally at higher speeds. If the material used to make the bumps is too soft it will be crushed or flattened by the load on the insert and the warning vibrations will be minimized. Preferably the bumps are made of a hard material such as rubber or plastic of Shore A hardness of at least 30. Other materials can also be used provided that they adhere well to the insert and are flexible in order not to break under load. Rubber slabs with a Shore A hardness of 60 are also satisfactory.

Figure 3:
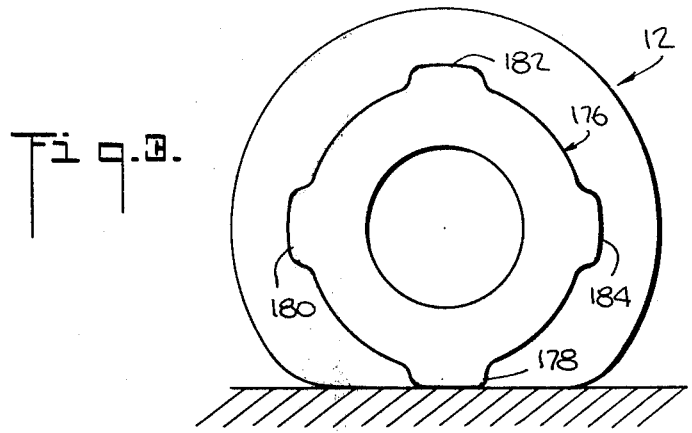

Further embodiments of the invention comprise inserts built with more than one bump at the periphery. The number, spacing and thickness of the bumps affect the type of vibration produced inside the vehicle. An insert 176 (FIG. 3) with four such bumps 178, 180, 182 and 184 symmetrically placed will produce roughness at low speeds, and a less disturbing vibration at 40–45 mph which disappears at higher speeds.

Still another insert with 4 such bumps but each being ⅛ inch thick instead of 0.3 inches thick will produce roughness up to 45 mph which changes gradually to a high frequency vibration up to 60 mph.

The bumps can be a part of the insert during its manufacture. For example after the required layers of ply and rubber are wrapped around a building drum the bumps can be cemented on at the appropriate places around the circumference. The whole assembly can then be shaped and cured in a simple operation. If a mold is used the assembled carcass will have to be positioned so that the bumps fit in respective depressions in the mold surface. Alternatively the bumps can be attached to the uncured carcass after expansion and before the assembly is put into the mold. Still a third method of building the bumps is to adhere the cured (or uncured) slabs to the cured insert in a manner similar to a cold (or hot) recapping process. This method eliminates rubber flow problems. Also because the slabs are absent when the insert is cured a simple smooth mold without indentations can be used. Therefore no orientation of the insert with respect to mold will be required. It is also feasible to incorporate the embodiments of FIGS. 2 and 3 in a non-pneumatic insert.

A further embodiment of the invention comprises the combination of an insert such as shown in FIG. 18 with a bump such as 172 of FIG. 2.

As will be apparent to those skilled in the art the insert need not necessarily be an open toroidal structure as disclosed herein but can be closed at its inner diameter and need not include beads. Such inserts are generally shown in the patents previously referred to. The type of pneumatic arrangement used is essentially a matter of choice. Although the insert disclosed herein is a two-ply construction further analogous embodiments of the invention can be incorporated in an insert with a single ply construction. Regardless of how many plies are included in an insert the high and low radius portions of the insert may be spaced or repeated at different circumferential extents.

Since the clearance between the insert and the tire can be established to provide contact at a predetermined inflation pressure as the tire loses air the insert thereby functions as a low pressure warning systems as well as a run-flat warning system.

The severity of the vibrations depend upon a number of factors among which are the residual inflation in the tire, the size, number and distribution of the protrusions or lobes around the insert as well as the speed of the vehicle. Thus the sensation of a vibration is different at different speeds as shown in the table. Therefore the quality of the vibration or disturbance can be controlled once a run-flat condition has been detected by operating the tire in a speed range that will produce the minimum amount of discomfort.

Some advantages of the present invention evident from the foregoing description include an insert having different radii attributable to ply sections having different cord angles, rather than ply sections having different stretch characteristics under different pressure conditions. Therefore the different radii of the present insert are not dependent upon a difference in inflation pressure between the insert and the tire.

Large tires of the type used on trucks usually operate with higher loads than passenger tires are subjected to. However higher loads tend to suppress vibrations. Therefore an effective warning system for larger tires requires a larger insert and a greater difference between R1 and R2.

Figures 4, 5:
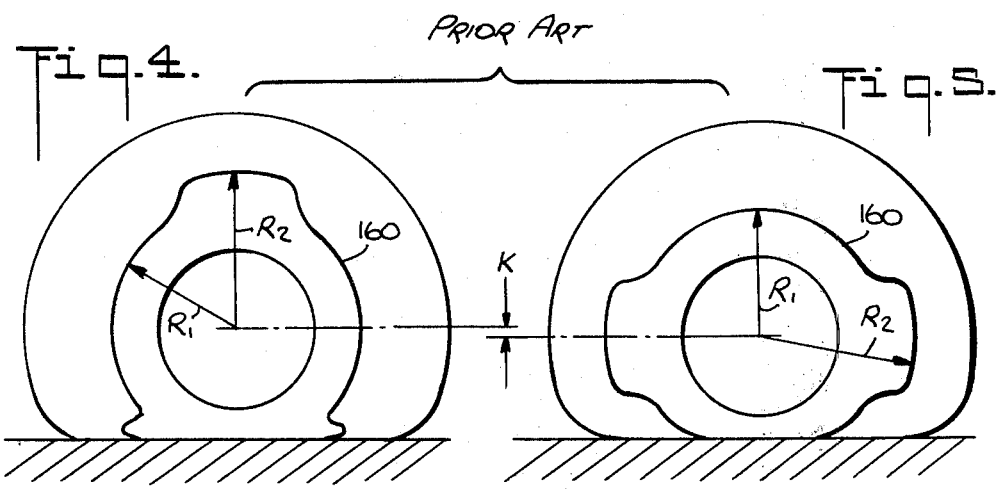
FIGS. 4-5 are simplified views of a prior art flat tire warning system.

In accordance with the present invention one can achieve a greater difference between R1 and R2 by merely changing the angular difference A-B, making such difference greater than that required for passenger tires. However an insert such as shown in FIGS. 4 and 5 which relies on stretchable material under pressure for the lobes will not have the size versatility of the present invention because in order to make the lobes smaller or larger one has to use different stretchable material or a different thickness of the same material. In a tire plant the use of such different materials would necessitate different manufacturing setups resulting in higher costs and greater quality control problems.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic insert for a pneumatic tire wherein the tire and insert are arranged to be supported on a wheel rim having an axis of rotation and an annular support surface, said insert comprising a generally toroidal-shaped hollow member with a pair of sidewall portions and a crown portion joining the sidewall portions, said insert further including an axis of rotation substantially coaxial with said wheel axis and an equatorial plane perpendicular to said insert axis, said insert being formed of at least one annular ply of cord material comprising at least two sections of predetermined circumferential extent joined together such that one of said sections is a continuation of the other said section, said one section having cords at a first bias angle only with said equatorial plane and said other section having cords at a second bias angle only with said equatorial plane, said first and second bias angles being dissimilar to furnish said insert crown with an out-of-round condition wherein the radial distance from the wheel axis to the insert crown at said one section is unequal to the radial distance from the wheel axis to the insert crown at said other section, said inequality being governed by the difference in bias angle of the cords in the first and second insert ply sections.

2. A pneumatic insert as claimed in claim 1 wherein said first bias angle is greater than said second bias angle.

3. A pneumatic insert as claimed in claim 1 wherein said first section is of greater circumferential extent than said second section.

4. A pneumatic insert as claimed in claim 3 wherein said first section extends approximately 75% of the circumference of said insert crown portion.

5. A pneumatic insert as claimed in claim 2 wherein the difference between said first and second bias angles is approximately 3 degrees to 20 degrees.

6. A pneumatic insert as claimed in claim 5 wherein said first bias angle is approximately 45 to 90 degrees.

7. A pneumatic insert as claimed in claim 2 wherein said first and second sections are of equal circumferential extent.

8. A pneumatic insert as claimed in claim 7 wherein said first and second sections each extend approximately 50% of the circumference of said insert crown portion.

9. A pneumatic insert as claimed in claim 7 wherein the difference between said first and second bias angles is approximately 3 degrees to 20 degrees.

10. A pneumatic insert as claimed in claim 9 wherein said first bias angle is approximately 45 to 90 degrees.

11. A pneumatic insert as claimed in claim 1 wherein said two sections are formed of the same materials.

12. A pneumatic insert as claimed in claim 1 wherein said two sections are spliced together with a predetermined overlap.

13. A pneumatic insert as claimed in claim 12 wherein said two sections of cord material have side edges and said two sections are splice cut at the same angle such that the splice overlap at each edge of said annular ply is equal.

14. A pneumatic insert as claimed in claim 1 further including a second annular ply of cord material superimposed on said first annular ply and comprising at least two sections of predetermined circumferential extent joined together such that one of said sections in said second annular ply is a continuation of the other said section in said second annular ply is a continuation of the other said section in said second annular ply, said one section in said second annular ply having cords at a third bias angle only with said equatorial plane and said other section in said second annular ply having cords at a fourth bias angle only with said equatorial plane, different from the third bias angle of said second annular ply, said second annular ply being arranged such that said first and second bias angles criss-cross said third and fourth bias angles.

15. A pneumatic insert as claimed in claim 14 wherein one of the ply sections in said first annular ply corresponds to one of the ply sections in said second annular ply.

16. A pneumatic insert as claimed in claim 15 wherein said corresponding ply sections are of substantially equal circumferential extent.

17. A pneumatic insert as claimed in claim 16 wherein said corresponding ply sections are in substantial registration.

18. A pneumatic insert as claimed in claim 16 wherein said corresponding ply sections are offset from each other.

19. A pneumatic insert as claimed in claim 15 wherein said corresponding ply sections are of unequal circumferential extent.

20. A pneumatic insert claimed in claim 18 wherein the corresponding ply section in said first annular ply is of greater circumferential extent than the corresponding ply section in said second annular ply.

21. A pneumatic insert as claimed in claim 18 wherein the corresponding ply section in said first annular ply is of less circumferential extent than the corresponding ply section in said second annular ply.

22. A pneumatic insert as claimed in claim 15 wherein the cords in said corresponding ply sections have substantially equal bias angles with respect to said equatorial plane.

23. A pneumatic insert as claimed in claim 15 wherein the cords in said corresponding ply sections have unequal bias angles with respect to said equatorial plane.

24. A pneumatic insert as claimed in claim 1 wherein said first annular ply comprises two groups of said two sections arranged such that said one section of one of said groups alternate with said other section of said other group.

25. A pneumatic insert as claimed in claim 1 wherein the crown portion has an inside surface and a layer of puncture sealant material coats said inside surface.

26. A pneumatic insert as claimed in claim 1 further including a layer of tear resistant material.

27. A pneumatic insert as claimed in claim 26 wherein said tear resistant material is formed of a woven fabric.

* * * * *